United States Patent
Dineros et al.

(10) Patent No.: US 10,324,898 B2
(45) Date of Patent: *Jun. 18, 2019

(54) PARALLEL CONTAINER AND RECORD ORGANIZATION

(71) Applicant: International Business Machines Corporation, Armonk, NY (US)

(72) Inventors: Ruen R. Dineros, Foothill Ranch, CA (US); Jeffrey L. Wallace, Costa Mesa, CA (US); Li Zhou, Irvine, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 693 days.

This patent is subject to a terminal disclaimer.

(21) Appl. No.: 14/683,852

(22) Filed: Apr. 10, 2015

(65) Prior Publication Data

US 2016/0078076 A1 Mar. 17, 2016

Related U.S. Application Data

(63) Continuation of application No. 14/486,409, filed on Sep. 15, 2014, now Pat. No. 9,619,476.

(51) Int. Cl.
| | |
|---|---|
| *G06F 17/00* | (2019.01) |
| *G06F 16/16* | (2019.01) |
| *G06F 16/11* | (2019.01) |
| *G06F 16/23* | (2019.01) |
| *G06F 16/2458* | (2019.01) |

(52) U.S. Cl.
CPC .......... *G06F 16/164* (2019.01); *G06F 16/11* (2019.01); *G06F 16/235* (2019.01); *G06F 16/2477* (2019.01)

(58) Field of Classification Search
CPC .. G06F 17/3012; G06F 17/3007; G06F 17/30; G06F 16/164; G06F 16/2477; G06F 16/1794
USPC .................................................. 707/600–899
See application file for complete search history.

(56) References Cited

U.S. PATENT DOCUMENTS

| | | | |
|---|---|---|---|
| 6,507,847 B1 | 1/2003 | Fleischman | |
| 8,332,367 B2 | 12/2012 | Bhattacherjee et al. | |
| 8,332,433 B2 | 12/2012 | Bentkofsky et al. | |
| 2006/0259527 A1* | 11/2006 | Devarakonda | .... G06F 17/30144 |
| 2011/0218995 A1* | 9/2011 | Ayars | ...................... G06F 17/30 707/737 |
| 2014/0002847 A1* | 1/2014 | Mizuno | .............. G06K 15/4095 358/1.14 |

OTHER PUBLICATIONS

Office Action 1, dated Jul. 26, 2016, for U.S. Appl. No. 14/486,409, filed Sep. 15, 2014 by R.R. Dineros et al., Total 21 pp. [57.318 (OA1)].

(Continued)

*Primary Examiner* — Isaac M Woo
(74) *Attorney, Agent, or Firm* — Konrad Raynes Davda & Victor LLP; Janaki K. Davda (57) ABSTRACT

Provided are techniques for parallel container and record organization using buckets. In response to receiving an update to an entity in a file plan, a date associated with a disposition of the entity is determined and a reference to the entity is added to a bucket associated with the date.

18 Claims, 10 Drawing Sheets

(56) References Cited

OTHER PUBLICATIONS

Response to Office Action 1, dated Oct. 26, 2016, for U.S. Appl. No. 14/486,409, filed Sep. 15, 2014 by R. R. Dineros et al., Total 9 pp. [57.318 (ROA1)].
List of IBM Patents or Patent Applications Treated as Related, Total 2 pp.
Abe, Y. and G. Gibson, "pWalrus: Towards Better Integration of Parallel File Systems into Cloud Storage", Workshop on Interfaces and Abstractions for Scientific Data Storage (IASDS10), co-located with IEEE Int. Conference on Cluster Computing 2010 (Cluster10), Heraklion, Greece, Sep. 2010, 2010 IEEE, Total 7 pp.
Ciaccia, P., "Parallel Independent Grid Files Based on a Dynamic Declustering Method Using Multiple Error Correcting Codes", Laboratory for Computer Science, University of Bologna (Italy),Technical Report UBLCS-94-21, Nov. 1994, Total 28 pp.
Corbett, P.F. and D.G. Feitelson, "The Vesta Parallel File System", © 1996 ACM, ACM Transactions on Computer Systems, vol. 14, No. 3, Aug. 1996, pp. 225-264. [Also, Total 40 pp.].
IBM Corp., "IBM Enterprise Records Performance Best Practices", [online], © Copyright IBM Corp. 2009, 2013, Retrieved from the Internet at <URL: http://www-01.ibm.com/support/docview.wss?rs=3286&uid=swg21330987>, Total 47 pp.
Mell, P. and T. Grance, "Effectively and Securely Using the Cloud Computing Paradigm", NIST, Information Technology Laboratory, Oct. 7, 2009, Total 80 pp.
Mell, P. and T. Grance, "The NIST Definition of Cloud Computing (Draft)", National Institute of Standards and Technology, Jan. 2011, Total 7 pp.
U.S. Patent Application with U.S. Appl. No. 14/486,409 filed Sep. 15, 2014, entitled, "Parallel Container and Record Organization", invented by R.R. Dineros et al., Total 35 pp. [57.318 (Appln)].
Preliminary Amendment, dated Apr. 10, 2015, for U.S. Appl. No. 14/486,409, filed Sep. 15, 2014 by R.R. Dineros et al., Total 5 pp. [57.318 (PrelimAmend)].
Notice of Allowance, dated Dec. 2, 2016, for U.S. Appl. No. 14/486,409, filed Sep. 15, 2014 by R.R. Dineros et al., Total 5 pp. [57.318 (NOA)].

* cited by examiner

PARALLEL CONTAINER AND RECORD ORGANIZATION

FIELD

Embodiments of the invention relate to parallel container and record organization using buckets. In particular, embodiments of the invention related to parallel container and record organization for separating business organization and application state using buckets.

BACKGROUND

A file plan may be described as a set of containers (e.g., folders) and records. The containers may hold records and other containers.

Record management file plan organization is primarily structured to meet customer business logic or business organizational requirements, as in the following examples:
  Organizational Structure
    Human Resources, Finance, Legal
  Categorization around topics, themes, or context
    personnel files, loan documents, legal cases
  Business States
    Inbox vs. Outbox, Active vs. Archived documents Such business-oriented file plan organizations often become unbalanced with respect to the number of individual records contained within individual file plan containers. While some such containers may have a relatively small number of records, others may reach record populations on the order of hundreds of thousands to even multiple millions of records.

While such an unbalanced record population distribution may be manageable from the customer's point of view (e.g., search mechanisms are used for desired records in lieu of browsing large containers), it can have an impact on the performance of other records management application tasks, such as disposition processing, hold management, report generation, etc. These types of application tasks often need to examine record-level criteria and, as such, involve queries against all records contained either directly within or below some file plan container hierarchy node. Such queries may be very time consuming to execute (which affects performance of other aspects of the application) and are not always amenable to typical performance improvement techniques such as the use of additional database indices.

Currently, there is an entity count limit on the number of file plan entities that may be associated with an individual workflow task instance. This entity count limit results in the need to create and manage multiple workflow task instances for a given logical workflow task when the number of entities involved is greater than the entity count limit. This results in a more complicated user experience when the user processes workflow tasks within a workflow inbox.

SUMMARY

Provided is a method for parallel container and record organization using buckets. The method comprises: in response to receiving an update to an entity in a file plan, determining, using a processor of a computer, a date associated with a disposition of the entity and adding a reference to the entity to a bucket associated with the date.

Provided is a computer program product for parallel container and record organization using buckets. The computer program product comprises a computer readable storage medium having program code embodied therewith, the program code executable by at least one processor to perform: in response to receiving an update to an entity in a file plan, determining a date associated with a disposition of the entity and adding a reference to the entity to a bucket associated with the date.

Provided is a computer system for parallel container and record organization using buckets. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: in response to receiving an update to an entity in a file plan, determining a date associated with a disposition of the entity and adding a reference to the entity to a bucket associated with the date.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
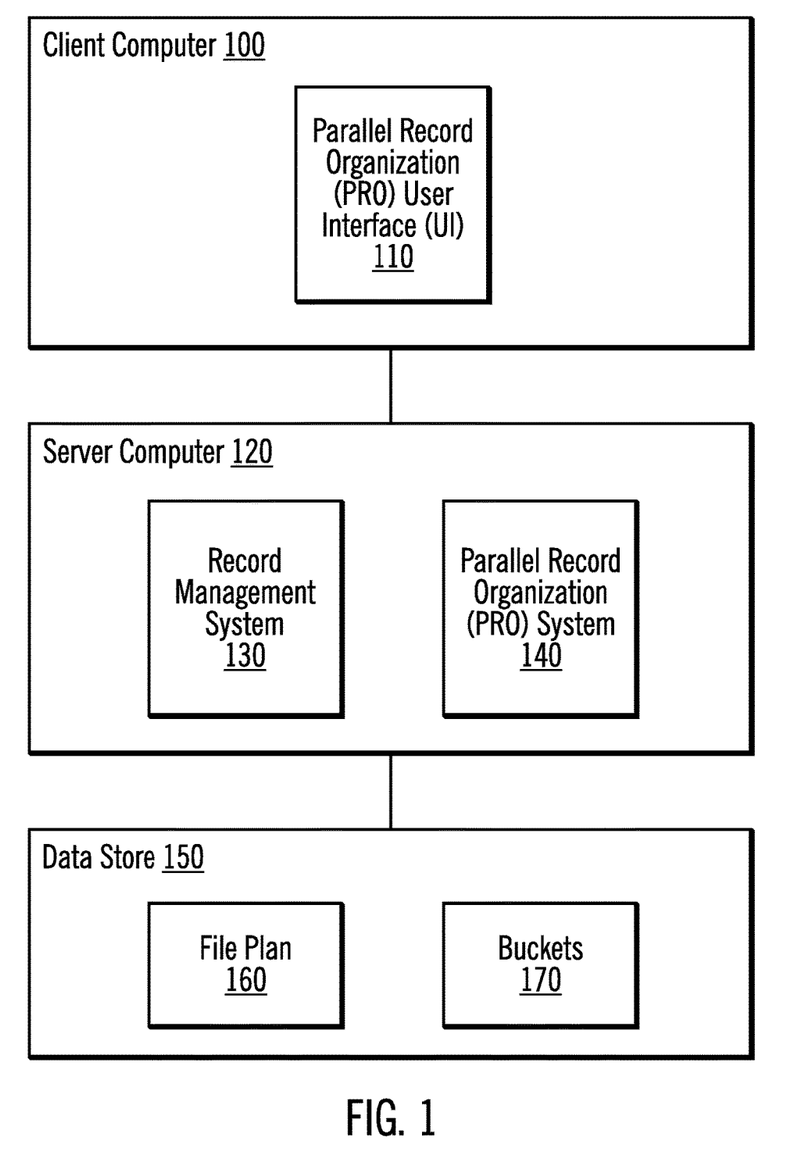
FIG. 1 illustrates, in a block diagram, a computing environment in accordance with certain embodiments.

FIG. 1 illustrates, in a block diagram, a computing environment in accordance with certain embodiments. In FIG. 1, a client computer 100 is coupled to a server computer 120. The client computer 100 includes a Parallel Record Organization (PRO) User Interface (UI) 110. The server computer 120 includes a record management system 130 and a Parallel Record Organization (PRO) system 140. The server computer 120 is coupled to a data store 150. The data store 150 includes a file plan 160 and buckets 170.

The PRO system 140 allows continued usage of business-oriented file plan structure (including unbalanced record distributions), while providing an alternate parallel structure optimized for records management application processing requirements, such as disposition processing, hold management, report generation, etc.

The PRO system 140 creates a parallel record organizational structure, in addition to the normal customer business-needs-based file plan structure already in place. This parallel structure organizes records into particular "buckets" based upon their individual state relative to a designated record management application processing need. In certain embodiments, such buckets are timeframe-based such that all records "contained" within a given bucket are targeted to require some form of processing on or after some specific date. In certain other embodiments, a given bucket may simply be used to temporarily contain a specific set of records that are involved in a common workflow task and no timeframe is necessarily involved (although a timeframe may optionally be involved).

A disposition state of a record may be, for example, review, destroy, hold, etc. As an example, when disposition processing occurs, only those records associated with buckets whose time frame exists in the past need be processed. There is no need to examine a potentially much larger number of records that may be required if disposition processing is based directly upon the customer-oriented, unbalanced file plan. Disposition processing performance is thus improved and exhibits a lesser performance impact on the rest of the records management application. For example, a customer defines a disposition schedule to destroy records whose contracts have been closed over 5 years. Today is 8/13/2014, and disposition processing finds records whose ContractClosedDate property value is equal to or less than 8/13/2009, sets relative disposition states in these disposition-ready records, and deletes these disposition-ready records.

If, for a particular record, disposition processing results in a change in the record's disposition state and a new disposition state-related date, then that record is simply re-associated to a different bucket whose time frame represents the new date.

With embodiments of the PRO system 140:

1. No restrictions are placed upon customer file plan modeling needs just for records management application processing purposes. The customer may continue to base a file plan structure on business logic/organizational needs.

2. Each record remains in one or more original business-oriented file plan locations. Thus, there is no disruption in finding a record or to its security state even though the record may have changed state in one or more aspects relative to record management application processes.

3. Unbalanced record distribution amongst the customer-oriented file plan container structure has less effect upon other records management application processes' performance.

With embodiments, the bucket mechanism may also be used to alleviate the entity count limit for workflow tasks. Instead of a workflow task containing multiple references to associated entities (for which the entity count limit applies), the workflow task refers to a single bucket that contains all entities to be processed by the workflow task. With embodiments, there is no need to instantiate multiple, duplicate workflow tasks simply due to the entity count limit. The workflow task logic may be modified to process all entities associated with the single bucket.

The buckets 170 may be described as bucket objects to which individual file plan record entities and/or file plan container entities may be associated. Each bucket 170 may be identified by a unique calendar date (year, month, day) and/or a Universally Unique Identifier (UUID).

Date-based buckets may be used to associate entities that have a same date in common on which some form of processing is to be performed on each of the entities. Each of the entities may be awaiting a different type of processing from one or more other entities in the same bucket. For example, a record entity may be eligible for disposition cutoff on the bucket date, while a container entity may be eligible for transitioning to a next phase in its unique disposition schedule.

UUID-based buckets may be used to associate entities that are members of a common workflow task. The workflow task logic may process all entities of this type of bucket as required by its particular workflow purpose.

Figure 2:
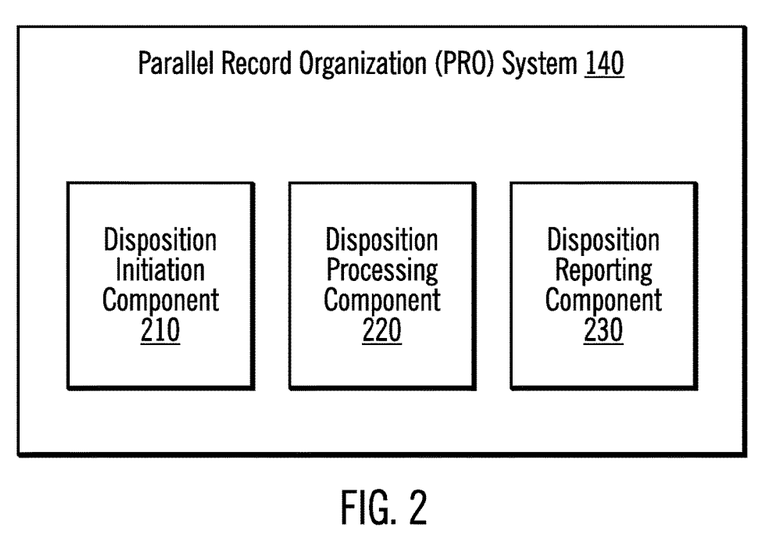
FIG. 2 illustrates components of a Parallel Record Organization (PRO) system in accordance with certain embodiments.

FIG. 2 illustrates components of the PRO system 140 in accordance with certain embodiments. For records management disposition processing requirements, the following runtime components interact with date-based buckets: a disposition initiation component 210, a disposition processing component 220, and a disposition reporting component 230.

The disposition initiation component 210 monitors metadata value updates on disposable entities (records and containers) at both entity creation time and for all subsequent updates to the entity. The disposition initiation component 210 determines whether any particular metadata value change has any effect on initiating disposition on the associated entity. If so, the disposition initiation component 210 establishes the correct disposition-related state on the entity and calculates the future date at which the entity should transition to its next disposition state. The disposition initiation component 210 finds, or creates if necessary, the appropriate bucket that is associated with this future date. The disposition initiation component 210 associates the entity with this bucket.

The disposition processing component 220 performs disposition state transition processing for all applicable disposable entities eligible for such up to a given point of time. The disposition processing component 220 finds the applicable entities by examining the contents of any appropriate bucket objects based upon the bucket date identifiers. If any such entity is ready for disposition state transition, then the disposition processing component 220 calculates its next transition date, finds or creates the appropriate target bucket object, associates the entity with this target bucket object, and removes the entity's association from its previous bucket object.

The disposition reporting component 230 uses existing bucket objects to report on all applicable disposable entities at some defined disposition state for a given time range (e.g., report on all records eligible for destruction in fourth quarter of next year).

Figure 3:
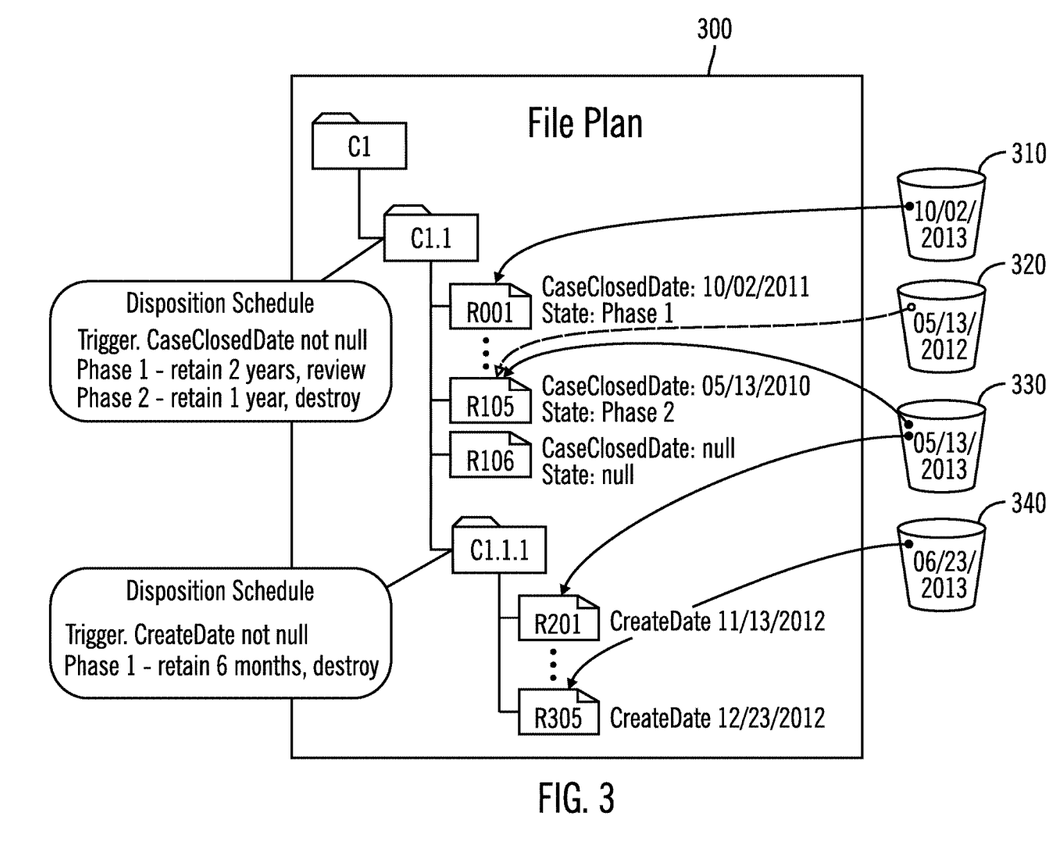
FIG. 3 illustrates an example file plan and date-based buckets in accordance with certain embodiments.

FIG. 3 illustrates an example file plan 300 and date-based buckets 310, 320, 330, 340 in accordance with certain embodiments. Containers C1, C1.1 and C1.1.1 make up a fragment of a records management file plan structure shown as file plan 300.

Container C1.1 has a disposition schedule assigned to it that is applied to all of its directly contained records. Attributes of this schedule are:

1. Begin disposition processing of a record once its CaseClosedDate property is set to a non-null value.

2. The record is retained in Phase 1 for 2 years and is then eligible for Review. Assuming that the Review process succeeds, the record transitions to Phase 2.

3. The record remains in Phase 2 for an additional year and is then eligible for destruction.

Container C1.1.1 has another disposition schedule assigned to it that is applied to each of its contained records. Attributes of this schedule are:

1. Disposition processing starts immediately with the creation of any new record because the record's CreateDate property is automatically defined at this time.

2. The record is retained in Phase 1 for 1 year and is then eligible for destruction.

Now consider the disposition states of the various record entities show in FIG. 3:

For record R001, the disposition initiation component 210 is automatically executed due to the setting of this record's CaseClosedDate property value. The disposition initiation component 210 starts disposition processing on the record by setting its state to Phase 1 and calculating an end phase date of 10/02/2013. A reference to record R001 is placed in bucket 310 ("Bucket-10/02/2013").

For record R105, the disposition initiation component 210 is automatically executed (for same reason as R001). The disposition initiation component 210 starts disposition processing on the record by setting its state to Phase 1 and calculating an end phase date of 05/13/2012. A reference to record R105 is placed in bucket 320 ("Bucket-05/13/2012"). At some time after 05/13/2012, the disposition processing component 220 is executed (e.g., because the customer needs run a disposition tool by their business schedule). The disposition processing component 220 examines all buckets whose dates reside before or on the execution time.

The disposition processing component 220 examines the records referenced by bucket 320 ("Bucket-05/13/2012"). The disposition processing component 220 finds that record R105 is now eligible to transition to Phase 2 of its schedule. As part of this transition process, the disposition processing component 220 moves the reference to record R105 from bucket 320 ("Bucket-05/13/2012") to bucket 330 ("Bucket-05/13/2013").

For record R106, since its CaseClosedDate has never been set, the disposition initiation component 210 has not yet processed record R106. Thus, record R106 has not begun disposition processing and, therefore, no reference to record R106 has been placed into any bucket.

For record R201, the disposition initiation component 210 is automatically executed due to automatic setting of record R201's CreateDate property at the time of the record's creation. The disposition initiation component 210 starts the record's disposition process. Since record R201 will be eligible for destruction on 05/13/2013, a reference to record R201 is placed into bucket 330 ("Bucket-05/13/2013"). Bucket 330 ("Bucket-05/13/2013") is an example of how unrelated entities may reside in the same bucket based upon the fact that each has some eligibility date falling in the same bucket time frame range.

For record R305, the disposition initiation component 210 automatically processes R305 in the same manner as record R201.

To continue following the lifecycle of some of these example records, assume that on 06/30/2013, the disposition processing component 220 is started. The disposition processing component 220 will fetch all records referenced by bucket 330 ("Bucket-05/13/2013") and find both record R105 and record R201. Examining the individual disposition state of each of these records will result in both of these records being destroyed.

In various embodiments, there are two mechanisms that may be used to implement the concept of the bucket.

In certain embodiments, a bucket may be implemented as a special sub-class of a folder object. All record assignments to a particular bucket folder may be implemented by filing them into the bucket. Thus any given record might be multi-filed: at least one filing somewhere within the normal file plan container hierarchy and one possible additional filing in some bucket. This bucket implementation mechanism allows file plan record entities to be associated with a bucket.

In certain other embodiments, a bucket may be implemented as a special sub-class of a custom object and a special sub-class of a link may be used to maintain associations between a given bucket custom object and any referenced records. Individual link instances may be created for each reference between a single bucket and a single record. The "head" of the link may refer to the record, while the "tail" of the link may refer to the bucket. This bucket implementation mechanism allows file plan container entities and record entities to be associated with a bucket.

Figure 4:
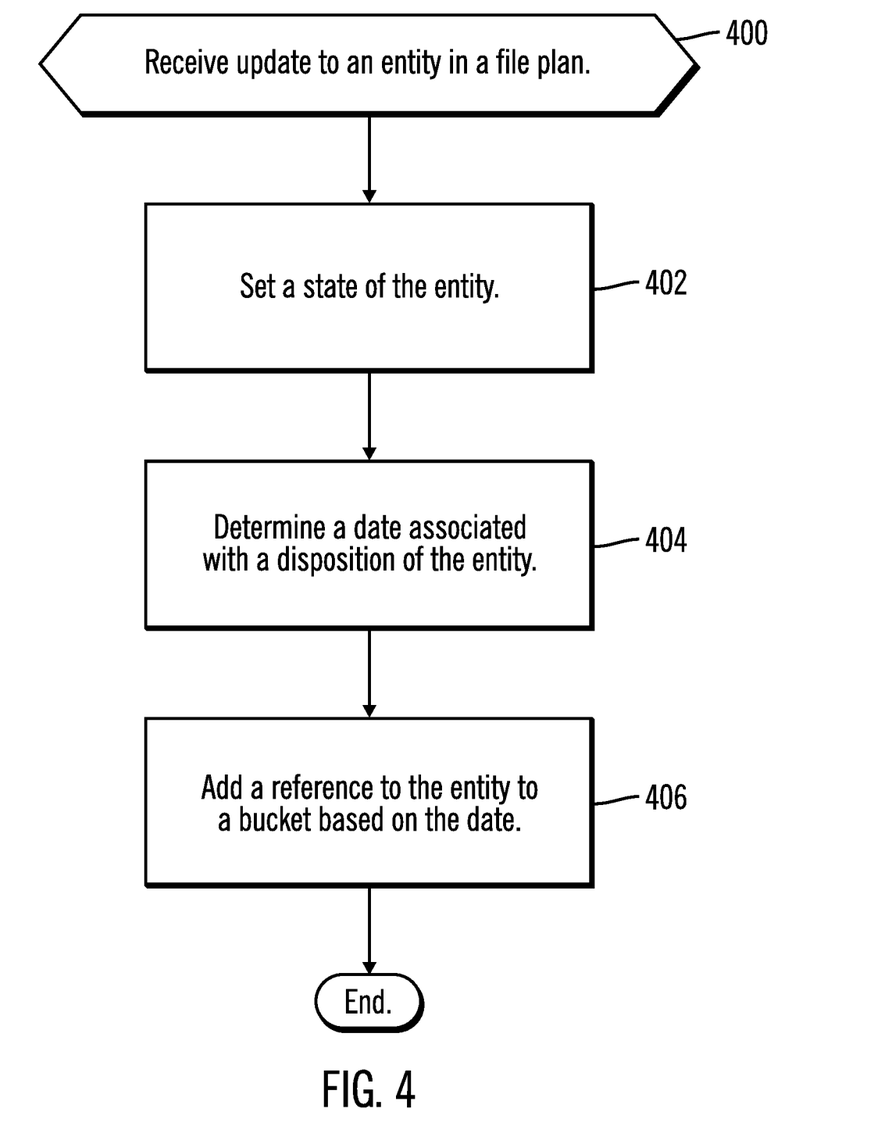
FIG. 4 illustrates, in a flow diagram, operations performed by a disposition initiation component in accordance with certain embodiments.

FIG. 4 illustrates, in a flow diagram, operations performed by a disposition initiation component 210 in accordance with certain embodiments. Control begins at block 400 with the disposition initiation component 210 receiving an update to an entity in a file plan. The update may be creation of the entity or changes to the entity or to metadata associated with the entity. In block 402, the disposition initiation component 210 sets a state of the entity. In block 404, the disposition initiation component 210 determines a date associated with a disposition of the entity. For example, in FIG. 3, the disposition schedule on container C1.1.1 is indicates retaining the record six months after the record creation date and then destroying the record. In this example, record R201 has a creation date of 11/13/2012, this creation date plus 6 months equals 5/13/2013, which is the destruction date. In block 406, the disposition initiation component 210 adds a reference to the entity to a bucket based on the date. Then, the entity is in the file plan and is in a bucket. The entity may be placed into multiple buckets. Also, placing an entity into a bucket may include creating the bucket or locating a bucket that was previously created and has the date that matches the date associated with the entity.

Figure 5:
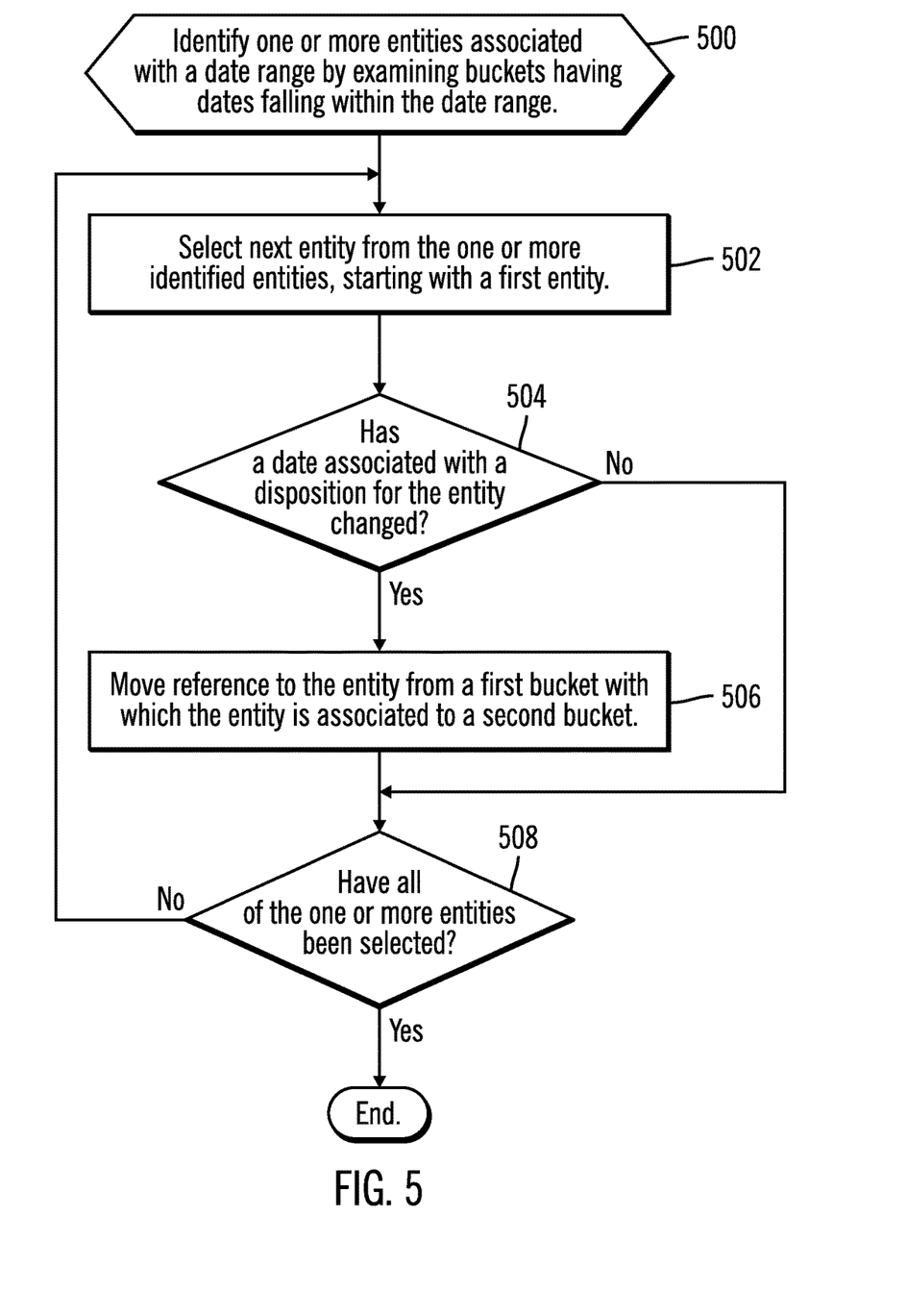
FIG. 5 illustrates, in a flow diagram, operations performed by a disposition processing component in accordance with certain embodiments.

FIG. 5 illustrates, in a flow diagram, operations performed by a disposition processing component 220 in accordance with certain embodiments. Control begins at block 500 with the disposition processing component 220 identifying one or more entities associated with a date range by examining buckets having dates falling within the date range. In block 502, the disposition processing component 220 selects a next entity from the one or more identified entities, starting with a first entity. In block 504, the disposition processing component 220 determines whether a date associated with a disposition for the entity has changed. If so, processing continues to block 506, otherwise, processing continues to block 508. In block 506, the disposition processing component 220 moves the reference to the entity from a first bucket with which the entity is associated to a second bucket. In certain embodiments, the move is done by adding the reference to the second bucket and removing the reference from the first bucket. In block 508, the disposition processing component 220 determines whether all of the one or more entities have been selected. If so, processing is done, otherwise, processing continues to block 502.

Figure 6:
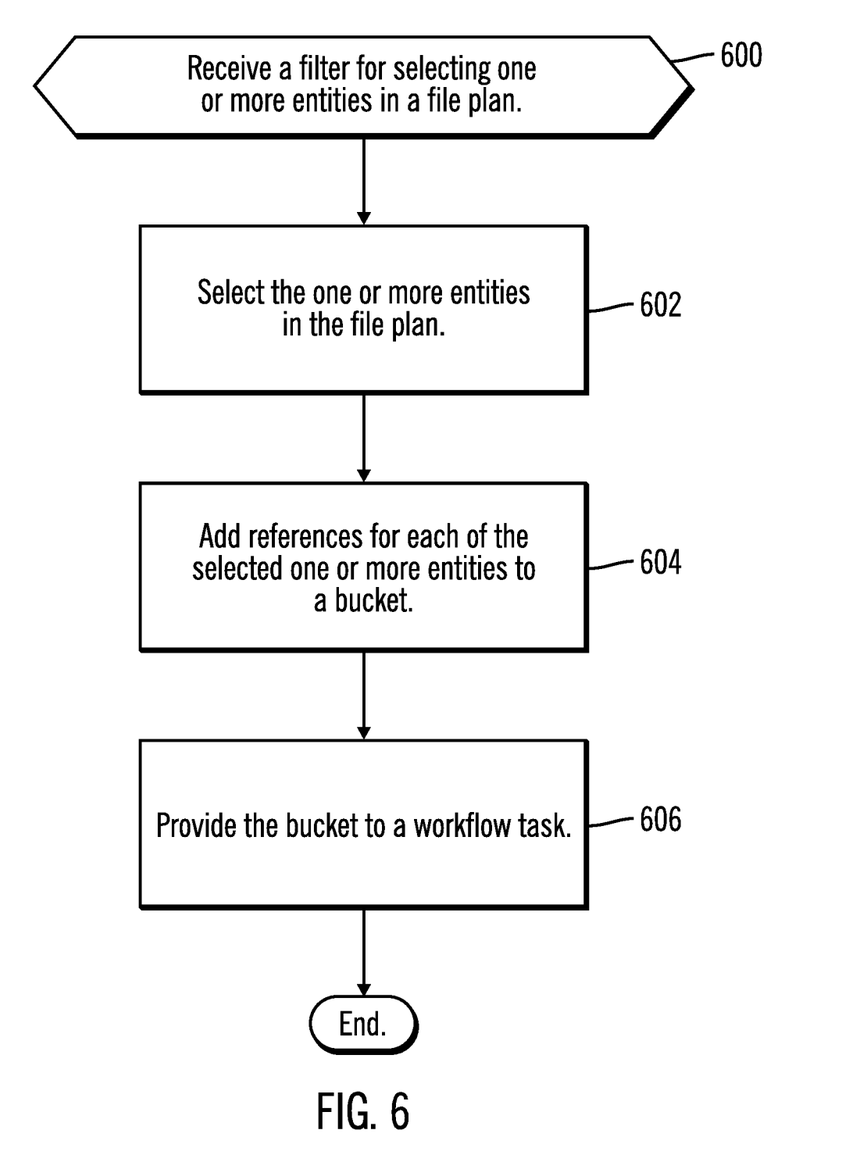
FIG. 6 illustrates, in a flow diagram, operations performed for a workflow task in accordance with certain embodiments.

FIG. 6 illustrates, in a flow diagram, operations performed for a workflow task in accordance with certain embodiments. Control begins at block 600 with the PRO system 140 receiving a filter for selecting one or more entities in a file plan. In block 602, the PRO system 140 selects the one or more entities in the file plan. In block 604, the PRO system 140 adds references for each of the selected one or more entities to a bucket. In block 606, the PRO system 140 provides the bucket to a workflow task. In this manner, the workflow task has all entities that it will process in one bucket. In certain embodiments, a disposition processing tool invokes the PRO system 140 to perform this filtering.

Figure 7:
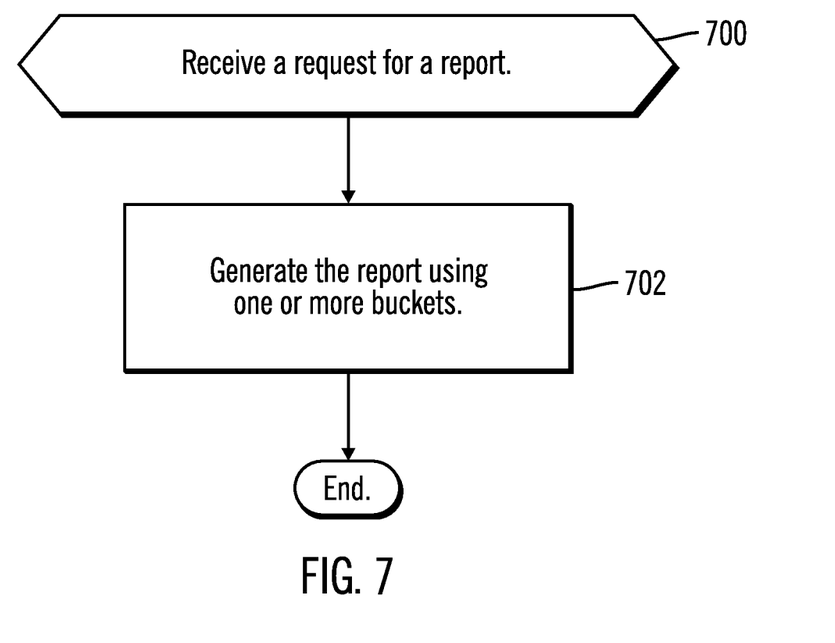
FIG. 7 illustrates, in a flow diagram, operations performed by a disposition reporting component in accordance with certain embodiments.

FIG. 7 illustrates, in a flow diagram, operations performed by a disposition reporting component 230 in accordance with certain embodiments. Control begins at block 700 with the disposition reporting component 230 receiving a request for a report. In block 702, the disposition reporting component 230 generates the report using one or more buckets. In these embodiments, there is no need to access the file plan.

Thus, in certain embodiments, buckets are created in parallel with a file plan. Then, references to entities (containers and records) that exist in the file plan are added to the bucket based on one or more factors (e.g., date or as needed by a workflow task). Next, processing of the entities in the file plan may be performed by processing the references in the buckets.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
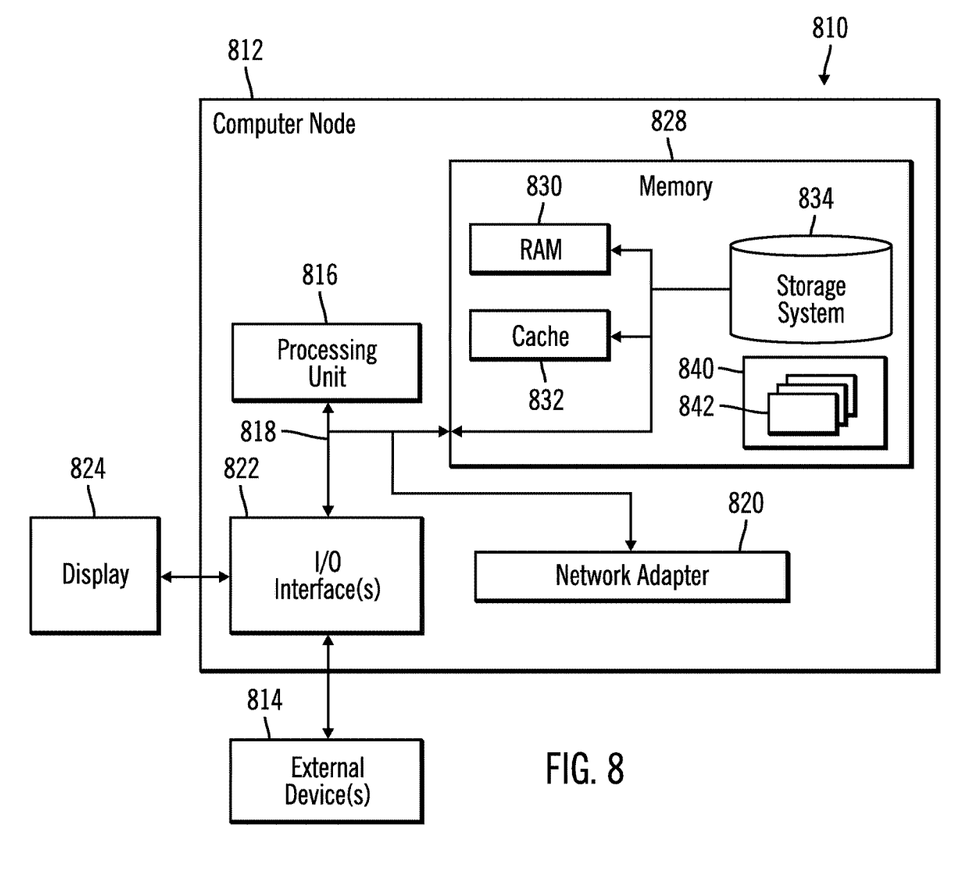
FIG. 8 illustrates a cloud computing node in accordance with certain embodiments.

Referring now to FIG. 8, a schematic of an example of a cloud computing node is shown. Cloud computing node 810 is only one example of a suitable cloud computing node and is not intended to suggest any limitation as to the scope of use or functionality of embodiments of the invention described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
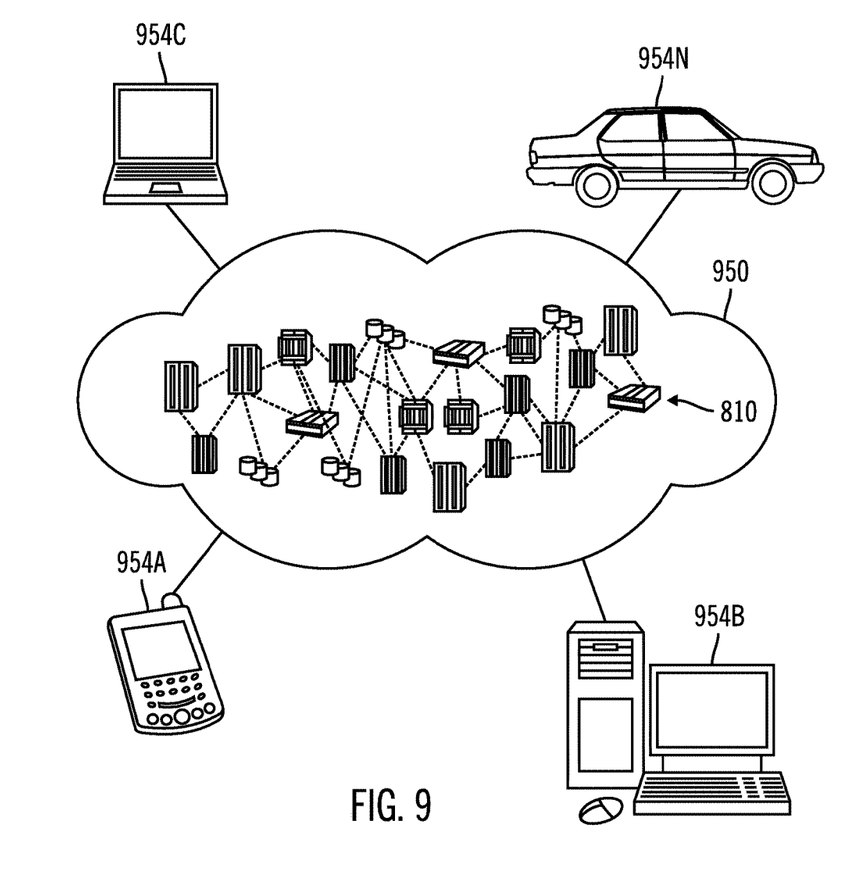
FIG. 9 illustrates a cloud computing environment in accordance with certain embodiments.

Referring now to FIG. 9, illustrative cloud computing environment 950 is depicted. As shown, cloud computing environment 950 comprises one or more cloud computing nodes 810 with which local computing devices used by cloud consumers, such as, for example, personal digital assistant (PDA) or cellular telephone 954A, desktop computer 954B, laptop computer 954C, and/or automobile computer system 954N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 810 and cloud computing environment 950 can communicate with any type of computerized device over any type of network and/or network addressable connection (e.g., using a web browser).

Figure 10:
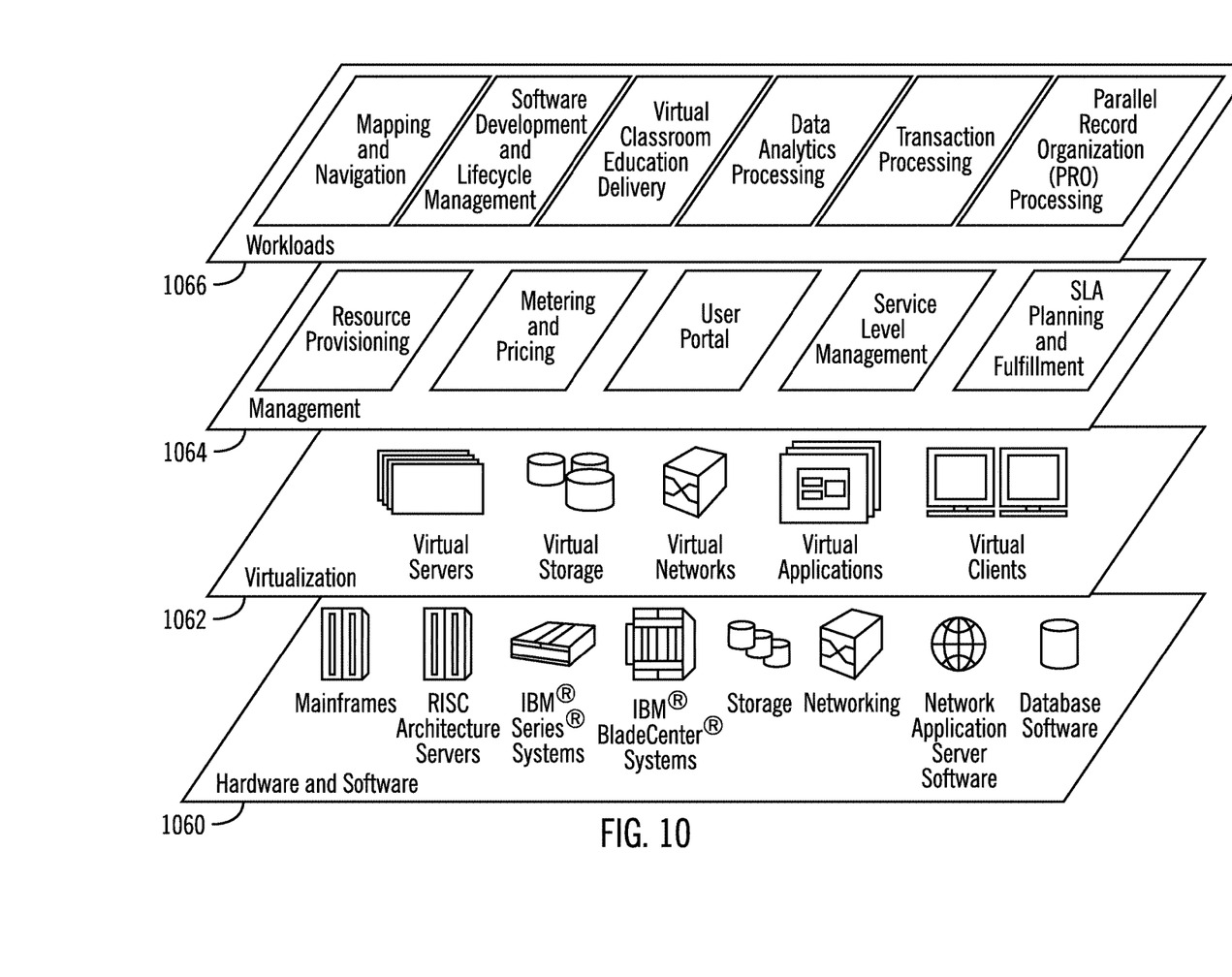
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and Parallel Record Organization (PRO) processing.

Thus, in certain embodiments, software or a program, implementing PRO processing in accordance with embodiments described herein, is provided as a service in a cloud environment.

In certain embodiments, the client computer 100 and/or the server computer 120 has the architecture of computing node 810. In certain embodiments, the client computer 100 and/or the server computer 120 are part of a cloud environment. In certain alternative embodiments, the client computer 100 and/or the server computer 120 are not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A computer-implemented method, comprising:
   in response to receiving an update to a record in a container of a file plan,
      determining a date associated with a disposition of the record; and
      adding a reference to the record to a bucket of a plurality of date-based buckets associated with the date; and
   maintaining in parallel, the record in the file plan for a search for the record and the reference to the record in the bucket for disposition processing;
   wherein the disposition processing includes:
      determining a new date associated with the disposition of the record; and
      moving the reference to the record to a new bucket of the plurality of date-based buckets associated with the new date.

2. The computer-implemented method of claim 1, wherein records associated with a date range are identified by examining the plurality of date-based buckets having associated dates falling within the date range for disposition processing.

3. The computer-implemented method of claim 1, further comprising:
   generating a report for the bucket.

4. The computer-implemented method of claim 1, wherein another reference in the bucket is to another record awaiting a different type of disposition state from the record.

5. The computer-implemented method of claim 1, further comprising:
   adding references to another bucket of the plurality of date-based buckets that refer to a set of records that are to be processed by a workflow task.

6. The computer-implemented method of claim 1, wherein a Software as a Service (SaaS) is configured to perform method operations.

7. A computer program product, the computer program product comprising a computer readable storage medium having program code embodied therewith, the program code executable by at least one processor to perform:
   in response to receiving an update to a record in a container of a file plan,
      determining a date associated with a disposition of the record; and
      adding a reference to the record to a bucket of a plurality of date-based buckets associated with the date; and
   maintaining in parallel, the record in the file plan for a search for the record and the reference to the record in the bucket for disposition processing;
   wherein the disposition processing includes:
      determining a new date associated with the disposition of the record; and
      moving the reference to the record to a new bucket of the plurality of date-based buckets associated with the new date.

8. The computer program product of claim 7, wherein records associated with a date range are identified by examining the plurality of date-based buckets having associated dates falling within the date range for disposition processing.

9. The computer program product of claim 7, the computer program product comprising a computer readable storage medium having program code embodied therewith, the program code executable by the at least one processor to perform:
   generating a report for the bucket.

10. The computer program product of claim 7, wherein another reference in the bucket is to another record awaiting a different type of disposition state from the record.

11. The computer program product of claim 7, the computer program product comprising a computer readable storage medium having program code embodied therewith, the program code executable by the at least one processor to perform:
   adding references to another bucket of the plurality of date-based buckets that refer to a set of records that are to be processed by a workflow task.

12. The computer program product of claim 7, wherein a Software as a Service (SaaS) is configured to perform computer program product operations.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
in response to receiving an update to a record in a container of a file plan,
determining a date associated with a disposition of the record; and
adding a reference to the record to a bucket of a plurality of date-based buckets associated with the date; and
maintaining in parallel, the record in the file plan for a search for the record and the reference to the record in the bucket for disposition processing;
wherein the disposition processing includes:
determining a new date associated with the disposition of the record; and
moving the reference to the record to a new bucket of the plurality of date-based buckets associated with the new date.

14. The computer system of claim 13, wherein records associated with a date range are identified by examining the plurality of date-based buckets having associated dates falling within the date range for disposition processing.

15. The computer system of claim 13, wherein the operations further comprise:
generating a report for the bucket.

16. The computer system of claim 13, wherein another reference in the bucket is to another record awaiting a different type of disposition state from the record.

17. The computer system of claim 13, wherein the operations further comprise:
adding references to another bucket of the plurality of date-based buckets that refer to a set of records that are to be processed by a workflow task.

18. The computer system of claim 13, wherein a Software as a Service (SaaS) is configured to perform computer system operations.

* * * * *